April 9, 1935.  B. B. BRYANT  1,997,356
INVISIBLE RADIATION, DETECTION, AND UTILIZATION
Original Filed Feb. 4, 1931
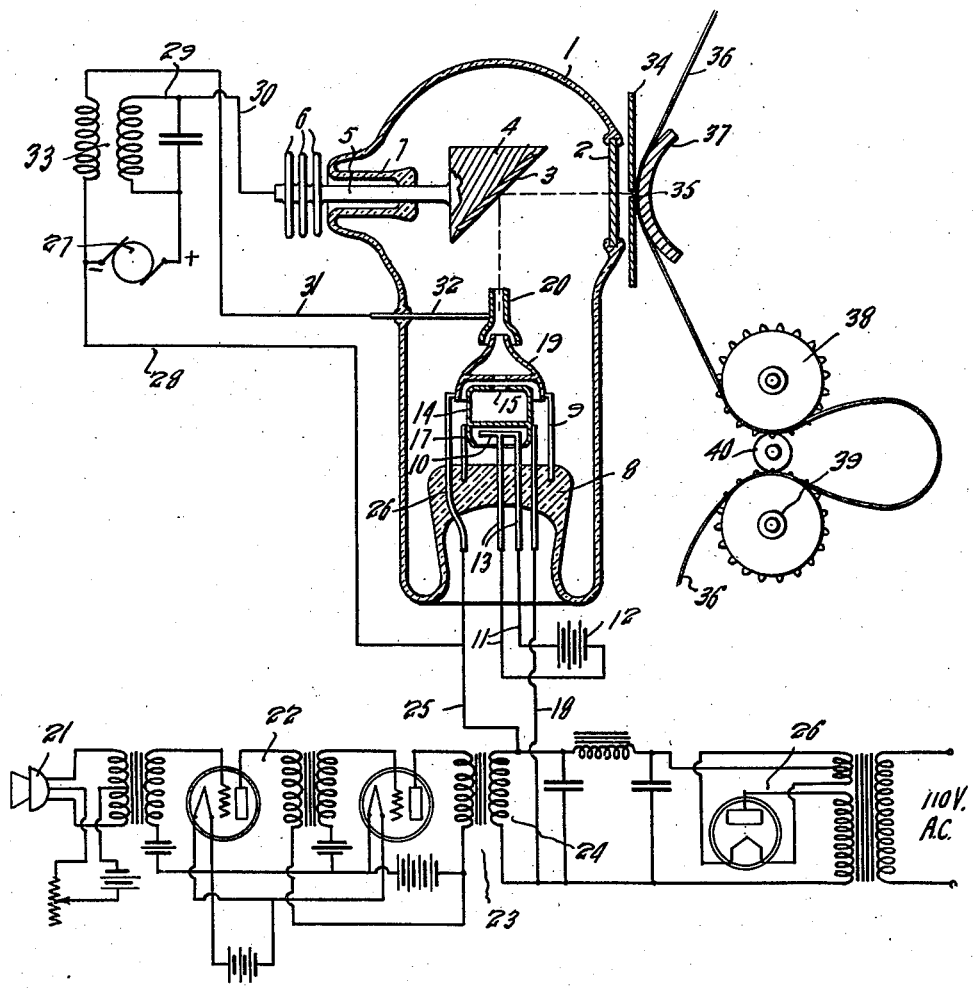
Inventor
BERYL B. BRYANT
By Semmes & Semmes
Attorneys Patented Apr. 9, 1935

1,997,356

UNITED STATES PATENT OFFICE 1,997,356

INVISIBLE RADIATION, DETECTION, AND UTILIZATION

Beryl B. Bryant, Brooklyn, N. Y.

Application February 4, 1931, Serial No. 513,393
Renewed August 30, 1934

6 Claims. (Cl. 179—100.3)

This invention relates to the recordation of audio frequency modulations and more particularly to a method of recording voice modulations upon a film.

A major object of the invention is to provide a new and improved method of recording on film, or other suitable receiving media, audio frequency modulations of greater clarity and detail than heretofore, and particularly one which largely overcomes the difficulties of inhalation or other disadvantages inherent in transmission and/or recordation by means of visible light rays.

Another object is to provide a novel method of nonhalation recordation of audio frequency modulation.

Another object is to provide a novel method and apparatus of recording electrical frequencies on photographic material.

A further object is to provide a novel type of oscillograph for the recordation of electrical frequencies.

Yet another object is to provide a new motion picture film upon which are recorded audio frequency modulations.

A further object is to provide a new method and apparatus for the observation and measurement of electrical frequencies.

With these and other equally important objects in view, the invention comprehends the utilization of the invisible spectrum of from approximately the 42.45 to the 60th octaves of the frequency spectrum which are modulated in accordance with the voice current or other frequencies which are to be measured, detected or observed.

Rays of the above designated character which comprehend the well-known soft ultra-violet, hard ultra-violet, soft, characteristic, secondary, hard, ultra X-rays, and gamma radiations X-rays, have substantially different characteristics from the visible rays. The rays in question are invisible to the eye, are not reflected by a polished surface and are not refracted by prismatic means or other ocular means. They are not deflected by an electric or magnetic field and hence do not carry an electric charge. Like cathode rays and the rays from radio-active substances, they tend to impart a temporary conductivity to gases through which they pass. These rays travel in straight lines from the point of generation and because of their very high frequencies may penetrate opaque substances and may be used to magnify objects many times their natural size. This magnification power is in substantially direct proportion to the square of the distance.

The intensity of penetration of this type of radiation is inversely proportional to the square of the distance and is determined by a number of factors, such as the velocity of the cathode stream, the degree of abruptness of arrest of the electrons of the cathode stream and the atomic characteristics of the target.

Because of the characteristics of this type of ray, it does not, as do the light rays, present the difficulties of halation so typical of the visible rays.

The present invention, considered broadly, therefore, comprehends the concept of modulating or controlling the emissivity of this type of ray by the electrical frequencies which are to be detected, indicated or recorded. Manifestly the concept is susceptible of a wide range of physical embodiments. Modulation of the emitted invisible rays may be done in a variety of manners, in which the frequency to be measured, detected or recorded may be used either directly and immediately or indirectly and immediately with any degree of amplification or diminution.

Considered more specifically, the invention comprehends the provision of a generator for the invisible rays, the effluent stream of the invisible rays of which are governed or controlled or modulated according to the voice current input into the system. The stream of invisible rays so modified are then directed onto a moving film of photographic material and the exposure of the film is determined by the intensity of the emitted rays and the speed of the film.

In order to more clearly describe the invention, a diagrammatic illustration of an apparatus embodying the principles thereof is shown in the accompanying drawing.

The apparatus shown in the drawing may, for general considerations, be considered as embodying an electrical organization connected to a cathode or electron emitting element; an electrical system in which the output is modulated in terms of the voice current or other frequencies which are to be measured, detected or recorded; and a controlling system which operates upon the emitted cathode stream and through this means varies the character of the emission of the X-rays. The controlling system is properly associated with the modulating system so that the emission of the X-ray is controlled in accordance with the modulations impressed upon the input end.

To more clearly explain the invention a preferred embodiment of it is shown in the drawing and will be described hereinafter. This, however, is given merely for the purpose of exemplification and is to be considered in a comprehensive and not a restrictive manner, for equivalent combinations and sub-combinations will readily suggest themselves to those skilled in the art. For example, in the preferred modification a transformer current that is rectified and filtered is used to set up the desired high potential difference necessary for the emission of the X-rays. By employing a transformer alone an alternating sinusoidal wave is produced, the inverse part of which is suppressed or rectified so as to produce a uni-directional pulsating current. In lieu of this a large induction coil may be used. The frequency in the case of the transformer alone or the induction coil should be as great as possible to promote clearness of image although it is not necessary to the function. The relative advantages and disadvantages of these two types of systems are well known to those skilled in the art. (The induction coil gives a more penetrating ray and has a desirable high heat-penetration factor. The transformer, on the other hand, provides a relatively large proportion of soft rays, many of which do not penetrate the walls of the tube, and has a heat penetration factor which is not as desirable as in the induction coil method.) These and other factors of the X-ray tube are well known and hence a wide latitude of choice in which these factors are governing is open to those operating under the principles of the invention. The description hereinafter, therefore, is to be considered as illustrative of one typical embodiment and not as the exclusive and sole manner of incorporating the features of an invention in an operable apparatus.

The apparatus considered more specifically comprises an X-ray tube 1 which may be constructed largely of lead glass, or other suitable material which is opaque or substantially opaque with respect to X-radiation. This tube is provided with a window 2 suitably fitted into the main portion of the evacuated envelope 1 and is composed of a material such as quartz, tourmaline or fluorite to permit transmission of the high frequency radiation with minimal absorption. If desired, this window may be composed of a metal such as copper, beryllium, aluminum or even thin sheet steel in the case of high power tubes.

Fitted within the envelope is an anti-cathode 3 composed of a suitable metal, preferably of high atomic density such as platinum or tungsten. For some purposes it is required that the element 3 be of low atomic density with high infusibility. In the present embodiment tungsten is preferred because of its high infusibility and thermal conductivity. Platinum, of course, may be employed to advantage; this has a higher radiation power than tungsten but is more susceptible to sputtering and is more fusible than tungsten. The tungsten target, which is preferred, is set at a preferred angle of 45° to the path of the cathode stream, or may be placed at any angle. The tungsten or platinum may be of any thickness, and is embedded in a copper block 4 to increase the quantum or mass of the metal and thereby diminish the tendency to rise in temperature. This block is fitted with a copper tube or rod 5 which projects outside the tube and is fitted at its end with any suitable type of heat radiating means 6. The tube or rod 5 is fitted into the evacuated envelope through a feather edge or other suitable seal 7 to prevent fracture due to the differential expansion and contraction of the glass and the metal.

The target or anti-cathode, as is known, serves as the main anode of the X-ray tube and is the element which serves to abruptly impede or arrest the cathode stream, at which point of arrest the X-ray or invisible radiation is generated or produced. Inasmuch as the fraction of the energy of the cathode stream which is emitted as X-radiation increases with atomic weight of the target, materials of high atomic density are employed. The surface extent of the target is determined by the amount of power applied to the electrodes and by its distance from the electron emitting electrode.

The envelope is formed with an enlarged base portion 8 from which extends a support 9. Within the envelope and at a point below the midpoint of the target is a filament or heater 10. This is provided with leads 11 extending to the filament heating battery or other heating filament source 12. The conductors 11 pass through suitable insulating tubes 13 fitted in the bottom of the envelope when of metal but is not necessary when the tube is constructed of high dielectric glass. Obviously in lieu of the A battery 12 any other suitable heat generating means may be employed. For example, the filament 10 may be connected to the A. C. line through a step-down transformer and the current rectified and filtered in the manner well known, or the transformer may be used alone in some instances where constant emission is not required.

The element 10 is employed to heat an electron emitter element 14. While on the drawing a separate electron heating element is shown, it is obvious that this element itself may be employed directly to emit the electrons of the cathode stream. The cathode or electron emitter 14 of the Wehnelt oxide coated type is formed in substantially drum shape and is provided at its upper portion with an aperture or diaphragm 15. The internal surface of the cathode is coated with oxide coatings or any other materials which are characterized by a facile electron emission. The aperture or diaphragm in the upper portion of the cathode is provided for the purpose of controlling the intensity of the electrons which are emitted from the internal walls of the element. While this element is shown as of drum shape, it manifestly may be made up of any other form or from any other suitable material. For example, instead of applying an internal coating of oxide on the drum this element may be made up in the form of a wire filament.

The cooperation of the elements 10 and 14 will have been appreciated from this description. The filament 10 heats the electron emission elements 14 up to the emitting temperature. The aperture in the upper section of the cathode serves to direct the electronic or cathode beam and to control the electronic intensity. The cathode may be suitably supported upon the base of the envelope as by the element 16. The cathode is connected by a lead 18 to a high voltage rectifier system, to be more fully described, for the purpose of applying the desired potential between the cathode and the auxiliary or modulating anode.

Suitably associated with the cathode is the modulating or auxiliary anode 19. This, as shown, is included in the output circuit of a frequency power amplifier, to be more fully described hereinafter, which supplies the modulated frequencies which are to be measured. The function of the element 19, or its equivalent, is to direct and control the intensity of the cathode or electronic stream. The control exercised by the element 14 is supplemented by the control element 20. The element 20, when included in the tube, assists in the control and direction of the cathode stream and in addition serves as a control element when the device is employed as a high frequency generator. In this use it modifies the velocity of the cathode stream and functions to reduce the power requirements and to increase the general efficiency of the device.

Interposed in the path of the cathode rays is the target 14 which, as described hereinbefore, is a metal of high melting point and high atomic density and which serves as the generative focal point of the X-radiation.

The X-ray tube described above is suitably connected to electrical circuits for the purpose of detecting, observing or recording variations corresponding to frequencies impressed on the input circuit.

As indicated above, one preferred though not exclusive use to which the assemblage may be put is that of recording audio frequency modulations upon a film. The similarity of this method and the common relationship of the fundamental factors to the other types of recordation of indication will readily suggest other specific uses to those skilled in the art. The input of the system comprises a microphone or other frequency generator or electrical converter 21 which picks up the sound or other waves to be recorded. The electrical frequencies corresponding to the sound or other waves are fed into and amplified by the cascade amplifier system indicated generally by the numeral 22. This is shown as comprising a two-stage transformer coupled amplifying system, but it will be readily understood that any other desired type may be employed and any desired extent of amplification may be secured. The output of the amplifier system feeds the amplified electrical frequencies into the impedance matching transformer 23. This transformer has its secondary winding 24 connected across the cathode 14 and the modulating anode 19. The Heising system of modulation may be employed when using the tube as a generator by connecting the anode of the amplifier direct to the element 4 making provisions for the proper potential supply of the output amplifier tube and the generator tube through a common anode inductance without impairment or attenuation of the frequencies used to modulate the generator. With the method shown this is done by connecting the anode 19 through the lead 25, which passes through the insulation tube 26, adjacent one end of the secondary transformer, and the cathode 14 through the lead 18 adjacent the other end.

Power may be supplied to the system through an A. C. line through the high voltage rectifier 26, which is shown as of conventional construction and needs no extensive description. In some instances the filter circuit is modified or padded with an impedance net work to prevent short circuiting of the modulating frequencies as is known by those skilled in the art. Preferably the rectifier is supplied with heating current for the filament through a secondary transformer winding section. The rectified uni-directional current, which is filtered and smoothed when required, supplies sufficient potential between the cathode 14 and the anode 19 for a proper control of the cathode stream. On this impressed potential is superimposed modulated frequencies from the input circuit through the transformer 23 so that, in a manner well known, the intensity of the electronic stream or cathode stream or beam is modulated or varied directly in accordance with the input frequencies modulated in accordance with the frequencies which are to be recorded.

Numeral 27 indicates a high voltage generator or any other type of high voltage frequency generator such as a magnetron, negatron, dynatron, plio-dynatron Vreeland generator or other type as desired, the negative of which is conductively connected, through the lead 28, to the auxiliary anode 19. The positive side of the high voltage generator is connected through the oscillatory circuit 29 and the lead 30 to the main anode 4. The auxiliary control element 20, which may be functionally considered as a grid sleeve, is connected, through the conductor 31 carried through the tube by means of the insulating tube 32, to one side of the inductance 33. The other end of this inductance is connected through the line 28 to the control electrode 19. The main modulating anode 19 and the grid control element, 20 are both preferably of conoidal shape and are constructed of suitable material so as to concentrate the cathode stream into a beam and to vary the intensity of this stream in accordance with the imposed modulating potentials.

From the description thus far it will be seen that the rectified alternating current feeding the input circuit consisting of the electron heater 14 or the electron emitting element 10 and the auxiliary anode 19, and the intensity of the cathode stream decreased, increased or otherwise controlled by the suitably chosen potentials of the control anodes 19 from the amplifier and the constant potential source 26 and by the suitably chosen potentials of the grid sleeve 20, results in the emission of an X-radiation from the focal point on the target through the transmitting plate 2. This radiation stream passes through the plate 2 and impinges upon the screen 34. This screen is provided with a slot or aperture 35 which is centered with respect to the center of the target or anti-cathode 4. The photographic film 36 is fed past the aperture 35 on a suitable guide 37. The movement of the film in front of the screen is effected by a suitable sprocket or other drive mechanism, comprising the rollers 38, 39 and 40.

The film employed for the present type of recordation is preferably more opaque or dense than the materials ordinarily employed in films, although the latter are successfully used. It has been found that the greater the opaqueness or denseness of the film the better the modulation. In the use of the present invention therefore it is preferred that the emulsion of the film contain a dense metallic salt such as lead or barium sulphate, or other materials which are capable of absorbing this type of radiation, and of soluble chemical reduction as the silver bromide salts in the ordinary photographic chemical reduction process.

It will be seen that the device may be adjusted, before the impression of any signals, so as to establish an X-radiation stream of any desired character and penetration. The envelope may be of suitable screening material or may be provided internally or externally with suitable screening material for absorbing secondary radiations. When the X-radiation stream of the desired value has been established, the incoming signals from the microphone 21 are amplified in the cascade amplifier 22 and these are impressed in the manner described upon the control electrodes so as to vary the quantum or intensity of the emitted stream of electrons in accordance with the impressed signals. The variation in the intensity of the cathode stream results in a corresponding variation in the intensity of the emitted X-radiation, and this in turn correspondingly and proportionately modifies the degree of exposure of the photographic film passing in front of the screen 34. Assuming a given regulated speed of movement of the film 32, the exposure of the film then corresponds to the signals impressed at the input end of the modulating system.

The preferred embodiment described herein comprises the association of an audio frequency controlled system with an X-radiation generator, the emanation of the X-radiation from which corresponds to the audio frequency modulations to be recorded. It will be appreciated that this system is of particular value and utility in the motion picture industry and in phonographic reproduction. Due to the non-halation characteristics of the invisible rays and to the accurate and true response to the impressed signals, phonographic reproduction of strict response is assured. This system, therefore, may be employed for an improved type of orthophonic recordation. The film having the exposed portions corresponding to the tonal effects impressed on the input system may be recorded in a phonograph, the speaker of which is operated from this type of film.

The system is of peculiarly effective utility in the motion picture industry. The X-radiations may be concentrated or focused upon any desired large or small section of the motion picture film so that the exposures of figures and of the oscillations corresponding to voice modulations may be simultaneously made on the same film. If desired, the voice modulations may be recorded on the thin strip of separate film and the recordation unit synchronized with the motion picture camera. After the completion of a picture or section of a picture the two films may be associated together for simultaneous reproduction.

It will be appreciated from the description given herein that the invention is not limited in use in the phonographic or photographic fields, but is of rather wide utility. For example, with the apparatus shown in the drawing, any factor which can be transmuted by microphonic or similar action into a corresponding variation in electrical output and which output can be made to vary the electrical characteristics of the control electrodes can be detected and/or measured and/or recorded by the present system with suitable modifications in the apparatus. Thus, for example, as pointed out hereinbefore, the element 21 may be any type of electrical converter, such as a hot wire microphone. When such hot wire microphone is employed it may be utilized, as will be understood by those skilled in the art, as a high temperature pyrometer inasmuch as the electrical effect impressed on the input circuit will be the function of the temperature. Similarly, the element 21, instead of being a microphone, may be a photoelectric cell, in which case the output of the X-ray tube will be a function of the light intensity to which the photoelectric tube is subjected. In short, the invention is susceptible for use in any field wherein it is desired to indicate or record any type of effect which may intermediately or immediately be transmuted into an electrical effect susceptible of varying the characteristics of the controlling electrodes. Manifestly two or more of the units may be associated so as to simultaneously indicate or record two similar or dissimilar effects for the purpose of immediate juxtaposition and comparison of simultaneous disclosures.

Therefore, while a specific physical embodiment of the invention has been disclosed, it is to be understood that this is given merely as one method of embodying the principles herein disclosed in a physical apparatus for the purpose of producing an improved physical result. The invention is conceived to comprehend all the mechanical and electrical embodiments and ramifications which operate in an equivalent manner to produce a comparable or similar result.

I claim:

1. A recording apparatus comprising a generator of radiations, a control electrode operable upon the electronic stream of the generator, and audio responsive means associated with the control electrode to effect a variation in the intensity of the electronic stream, and a second control electrode, connected to a high frequency generator and so positioned as to operate on the electronic stream to further vary the intensity thereof whereby the output of the generator is varied in accordance with the input audio frequency waves.

2. A recording system comprising an input circuit for audio frequency waves, a generator of invisible radiations said generator having two control electrodes interposed between an electron emitting element and an electron arresting element, means to connect one of said electrodes to a high frequency generator, and means to connect the said input circuit to the other control electrode of the generator so as to vary the emission of the invisible radiations in accordance with variations in the frequencies impressed on the input circuit and in accordance with the potential applied by the high frequency generator.

3. A method of recording sound comprising transmitting sound waves into electrical energy, generating invisible radiations by the arrest of a high velocity electronic stream; varying the emission of the invisible radiations by utilizing the said electrical energy to modify the characteristics of the electronic stream then intensifying the modification of the stream by subjecting it to additional accelerating potential and photographically recording the variation of the emitted invisible radiation.

4. A method of indicating sound waves comprising transmuting the sound waves into corresponding electrical energy, generating invisible radiations by suddenly arresting an electronic stream, modifying the intensity of the invisible radiations generated by causing the transmuted electrical energy to act upon the electronic stream and further increasing the intensity of the invisible radiations by subjecting the electronic stream, as modified by the transmuted electrical energy and before arresting, to an additional potential independent of the said transmuted electrical energy.

5. A sound recording system comprising a microphonic device and an amplifying circuit for the variable energy generated by the device; a generator of invisible radiations, the generator comprising an electron emitting element, a target interposed in the path of the electrons emanating from said element, a control electrode interposed between said element and the target and connected to the output of said amplifying circuit, said control electrode operating to increase the intensity of the electronic stream and to concentrate such stream into a more concentrated beam; a second control electrode encompassing the said concentrated beam, interposed between the first said control electrode and the target and connected to a high frequency generator and operating upon the audio modulated electronic stream to increase its intensity and to concentrate the stream; and means comprising a sensitized film to record the modulated invisible radiations emitted from the target.

6. A sound recording system comprising a pickup device and an amplifying circuit for the variable energy generated by the device; a generator of invisible radiations of the X-ray type, such generator comprising an electron emitting element, a target of high atomic density interposed in the path of the electron emanating from the electron emitting element, a control electrode interposed between said element and the target and connected to the output of the amplifying circuit, said control electrode enclosing the stream of electrons emitted from the electrode emitting element and functioning to increase or decrease the intensity of the electronic stream in accordance with the energy impressed thereon from the amplifying circuit; a second control electrode encompassing the modulated beam and interposed between the first control electrode and the target but said second control electrode being connected to a high voltage source and functioning to increase the intensity of and concentrate the electronic stream before such stream is impinged upon the target, and means comprising a sensitized film positioned within the path of the invisible radiations emitted from the said target.

BERYL B. BRYANT.